(12) United States Patent
Kostin et al.

(10) Patent No.: US 9,045,061 B2
(45) Date of Patent: Jun. 2, 2015

(54) VEHICLE SEAT HAVING A HEIGHT ADJUSTMENT DEVICE

(75) Inventors: Sergej Kostin, Coburg (DE); Johannes Ultsch, Lichtenfels (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 61 days.

(21) Appl. No.: 13/997,133

(22) PCT Filed: Dec. 16, 2011

(86) PCT No.: PCT/EP2011/006372
§ 371 (c)(1),
(2), (4) Date: Jul. 10, 2013

(87) PCT Pub. No.: WO2012/084158
PCT Pub. Date: Jun. 28, 2012

(65) Prior Publication Data
US 2013/0278031 A1     Oct. 24, 2013

(30) Foreign Application Priority Data

Dec. 22, 2010   (DE) .......................... 10 2010 063 972

(51) Int. Cl.
*A47C 1/00*  (2006.01)
*B60N 2/16*  (2006.01)
(Continued)

(52) U.S. Cl.
CPC .............. *B60N 2/165* (2013.01); *B60N 2/1615* (2013.01); *B60N 2/0722* (2013.01); *B60N 2002/0236* (2013.01)

(58) Field of Classification Search
CPC ...... B60N 2/16; B60N 2/1615; B60N 2/1635; B60N 2/165; B60N 2/1695

USPC .............. 297/344.12, 344.13, 344.15, 344.17
See application file for complete search history.

(56) References Cited

U.S. PATENT DOCUMENTS 2,953,190 A   9/1960   Tanaka
4,186,904 A   2/1980   Reinmöller et al.
(Continued)

FOREIGN PATENT DOCUMENTS

DE   26 41 243 A1   3/1978
DE   28 41 511 A1   4/1980
(Continued)

OTHER PUBLICATIONS

English translation of JP Office action for Application No. 2013-545091 dated Aug. 5, 2014, 4 sheets.
(Continued)

*Primary Examiner* — Philip Gabler
(74) *Attorney, Agent, or Firm* — Christie, Parker & Hale, LLP (57) ABSTRACT

The invention relates to a vehicle seat comprising a seat part for providing a seat surface for a seat occupant, a guide track arrangement for the longitudinally adjustable arrangement of the vehicle seat in a vehicle and a height adjustment device comprising a plurality of rockers which are pivotably coupled to the seat part and the guide track arrangement and which connect the seat part to the guide track arrangement so as to be adjustable in height, and a electromotive drive unit for driving a first rocker of the plurality of rockers. The drive unit has an output pinion which engages in a toothing of a tooth segment and can be set into rotation with respect to the tooth segment for adjusting the seat height of the seat part relative to the guide track arrangement. To this end, the output pinion is arranged on the first rocker and the tooth segment is arranged stationary on the guide track arrangement or on the seat part.

10 Claims, 10 Drawing Sheets

(51) Int. Cl.
*B60N 2/07* (2006.01)
*B60N 2/02* (2006.01)

(56) References Cited

U.S. PATENT DOCUMENTS

| | | | | |
|---|---|---|---|---|
| 4,229,041 | A | * | 10/1980 | Werner .......................... 297/468 |
| 4,385,743 | A | * | 5/1983 | Werner .......................... 248/393 |
| 4,568,053 | A | | 2/1986 | Strowik et al. |
| 4,993,678 | A | * | 2/1991 | Easter .......................... 248/371 |
| 6,264,275 | B1 | * | 7/2001 | Frohnhaus et al. ...... 297/344.12 |
| 6,666,423 | B1 | * | 12/2003 | Nemoto .......................... 248/421 |
| 7,472,951 | B2 | * | 1/2009 | Herold et al. ................. 297/182 |
| 2001/0005003 | A1 | | 6/2001 | Koga et al. |

FOREIGN PATENT DOCUMENTS

| | | |
|---|---|---|
| DE | 29 33 092 A1 | 2/1981 |
| DE | 689 09 364 T2 | 4/1994 |
| EP | 0 366 364 B1 | 9/1993 |
| FR | 2 503 061 | 8/1982 |
| JP | 59-23738 A | 2/1984 |
| JP | 2001-163091 A | 6/2001 |

OTHER PUBLICATIONS

English translation of International Preliminary Report on Patentability for Application No. PCT/EP2011/006372, dated Jun. 25, 2013, 7 sheets.

* cited by examiner

VEHICLE SEAT HAVING A HEIGHT ADJUSTMENT DEVICE

CROSS-REFERENCE TO A RELATED APPLICATION

This application is a National Phase Patent Application of International Patent Application Number PCT/EP2011/006372, filed on Dec. 16, 2011, which claims priority of German Patent Application Number 10 2010 063 972.9, filed on Dec. 22, 2010.

BACKGROUND

The invention relates to a vehicle seat.

Such a vehicle seat comprises a seat part for providing a seat surface for a seat occupant, a guide track arrangement for the longitudinally adjustable arrangement of the vehicle seat in a vehicle and a height adjustment device for adjusting the seat height of the vehicle seat. The height adjustment device comprises a plurality of rockers which are pivotably coupled to the seat part and the guide track arrangement, wherein said rockers connect the seat part to the guide track arrangement so as to be adjustable in height. In order to drive a first of these rockers and furthermore to adjust the seat part relative to the guide track arrangement for the purpose of seat height adjustment the height adjustment device comprises an electromotive drive unit, which comprises an output pinion, which engages in a toothing of a tooth segment and can be rotated in respect to the tooth segment for adjusting the seat height.

In case of a conventional vehicle seat of this kind, the tooth segment is connected to the first rocker and is moved by a drive unit connected to the seat part or the guide track arrangement. The drive unit drives hereby an output pinion engaging in the tooth segment and exerts in this manner an adjustment force onto the first rocker connected to the tooth segment. Since the output pinion unrolls on the tooth segment the first rocker and together therewith also the remaining rockers according to the type of a four joint is pivoted such that the seat part is adjusted in the seat height thereof.

In case of a vehicle seat known from EP 0 366 364 B1 a pinion is arranged on a side part of a seat part and engages in a tooth segment formed in one piece on a rocker. The pinion can be manually rotated for adjusting the height of the vehicle seat in order to pivot the assigned rocker in this manner. Additionally, the inclination of the seat part can be adjusted by engaging a pinion arranged on the rocker in a tooth segment on a guide track arrangement.

In case of a vehicle seat known from U.S. Pat. No. 4,229,041 a seat frame of a seat part is mounted pivotably on a guide track arrangement. A pinion arranged on the seat frame engages in a tooth segment arranged on the guide track arrangement and can be rotated for pivoting the seat frame relative to the guide track arrangement for the purpose of adjusting the height of the seat part.

A vehicle seat is known from FR 2503061 in which a seat part is connected pivotably to a guide track arrangement and the inclination thereof can be adjusted by a pinion engaging in a tooth segment on the guide track arrangement.

In conventional vehicle seats, which use electromotive drives for a height adjustment device, the drive is arranged usually on the side of the vehicle seat facing the vehicle door, where sufficient construction space for connecting the drive to the seat part or to the guide track arrangement is available. If however the drive shall be arranged at the so called tunnel side of the vehicle seat situated towards the vehicle centre, then a tight connection of the drive to the seat part or the guide track arrangement may be difficult, since on this side of the vehicle seat less construction space is available and in particular an arrangement of the drive outside of the seat part or the guide track arrangement is not possible. An arrangement of a drive on said tunnel side can however be desirable, if, e.g., a belt attachment point for attaching a seat belt at the tunnel side on the seat part shall be provided. In this case the tunnel side of the vehicle seat is subjected in case of a crash to high loading forces, which can be supported and dissipated by the drive unit arranged on the tunnel side and engagement of the output pinion in the tooth segment at the driven rocker. The requirements for rigidity and crash stability of the output pinion-tooth segment-engagement via which the driven rocker and thus the seat part is retained altogether in position are high in this case and have to be designed for loading forces dissipating in a crash case via the belt attachment point on the tunnel side into the seat part.

SUMMARY

Object of the present invention is to provide a vehicle seat which allows the arrangement of an electromotive drive unit in a space saving manner also on the tunnel side of a vehicle seat and can provide simultaneously a reliable support of loading forces. Weight reduction in respect to conventional arrangements is also desirable.

According to an exemplary embodiment of the invention, it is provided that the output pinion is arranged on the first rocker and the tooth segment is arranged stationary on the guide track arrangement or the seat part.

Hereby the electromotive drive unit is preferably tightly connected to the first rocker and can be pivoted together with the first rocker.

Since the tooth segment is arranged stationary on the guide track arrangement or the seat part and the output pinion is arranged stationary (but rotatable) on the first rocker, no construction space has to be provided any longer for the attachment of the electromotive driven output pinion and the electromotive drive unit on the guide track arrangement or the seat part. The electromotive drive unit can be connected rather to the (first) rocker and moves with the driven (first) rocker during operation such that the drive unit is pivoted relative to the guide track arrangement and the seat part.

The arrangement according to the invention allows on the one hand a space saving arrangement of the drive unit also on the tunnel side of the vehicle seat. On the other hand, a stiff crash tight support of the seat part can be provided by the driven first rocker and the output pinion-tooth segment-engagement provided thereon, wherein the arrangement of the output pinion on the first rocker allows for a compact construction with short force paths. By using a pinion-tooth segment-drive, a weight reduction and a reduction of the number of components can result in comparison to other drive units (for instance, according to the type of a spindle gear) due to the simple construction.

The seat part comprises preferably two side parts between which a cross tube extends along a pivot axis. The cross tube is mounted thereby pivotally on the side parts and is connected tightly to the first rocker such that the rocker can be pivoted towards the side parts via the cross tube. A belt attachment point for fixing a seat belt on the seat part can be arranged hereby on a first of the two side parts, whereby in this case the first rocker is arranged preferably on an end of the cross tube facing the first side part. The first rocker connected to the electromotive drive unit and carrying the output pinion is arranged thus on the first side part carrying the belt attachment point and supports said side part, such that in case of a crash the acting loading forces can be dissipated via the first rocker and the output pinion-tooth segment-engagement coupling the first rocker to the guide track arrangement in a comparatively short force path into the guide track arrangement and about that into the vehicle floor.

Due to the short force path, a weight reduction can also result. In particular, the parts located in the force path have to be designed sufficiently strong for fulfilling the stability requirements. By shortening the force path and a compact design of the tooth segment-pinion-engagement components, which are located outside of the force flow in particular at loading forces acting in a crash case, can be optionally dimensioned lighter in order to achieve in total a weight reduction.

The first rocker can be, for instance, part of a rear rocker pair, which—in respect to a vehicle longitudinal direction when assembling the vehicle seat into a vehicle as intended—is arranged behind a front rocker pair. The rear rocker pair is formed by a first rocker arranged on the sides of the first side part on the cross tube and a second rocker, which is arranged on an end of the cross tube facing the second side part of the seat part and is connected tightly thereto. The first rocker is arranged thereby according to the position of the belt attachment point, in particular on a tunnel side of the vehicle seat located towards the vehicle centre in order to support and dissipate the loading forces introduced via the belt attachment point. A belt lock can be mounted, for instance, on the belt attachment point, which is moved together with a seat part when moving the seat part for longitudinal adjustment or height adjustment of the vehicle seat.

In a specific embodiment the output opinion can reach through a notch of the first rocker arranged on the cross tube and engage in the tooth segment. The output pinion is arranged thereby on an output shaft, which projects with one end from the output pinion and is supported additionally by an supporting element relative to the cross tube. The first rocker and the supporting element are connected hereby preferably in each case tightly to the cross tube, for instance welded, project across to the pivot axis from the cross tube and accommodate the tooth segment there between if looked at along the pivot axis. The first rocker and the supporting element are arranged thus on the cross tube with a distance from each other if looked at along the pivot axis and form an intermediate space there between, in which the tooth segment is arranged. The output pinion reaches into this intermediate space and engages there in the tooth segment.

Instead of such a supporting element, a lock washer for axial securing the engagement of the output pinion in the tooth segment can also be arranged in a specifically simple embodiment on the projecting end of the output shaft.

The tooth segment is connected tightly to the guide track arrangement preferably by a holding element, whereby the holding element can carry also the first rocker and can be mounted pivotably on the guide track arrangement. A compact construction is provided, in which the bearing point for the first rocker on the guide track arrangement and the tooth segment are formed on one single component and the relationship between the bearing point and the tooth segment (and thus the engagement of the output pinion in the tooth segment) is determined. The tooth segment can be formed, for instance, in one piece on a crank of the holding element, whereby it is also conceivable and possible to design the tooth segment as an additional component and to connect to the holding element, for instance, by rivets or screws.

BRIEF DESCRIPTION OF THE DRAWINGS

The idea underlying the invention shall be explained in the following by means of the embodiments illustrated in the Figures in more detail.

DETAILED DESCRIPTION

Figure 1:
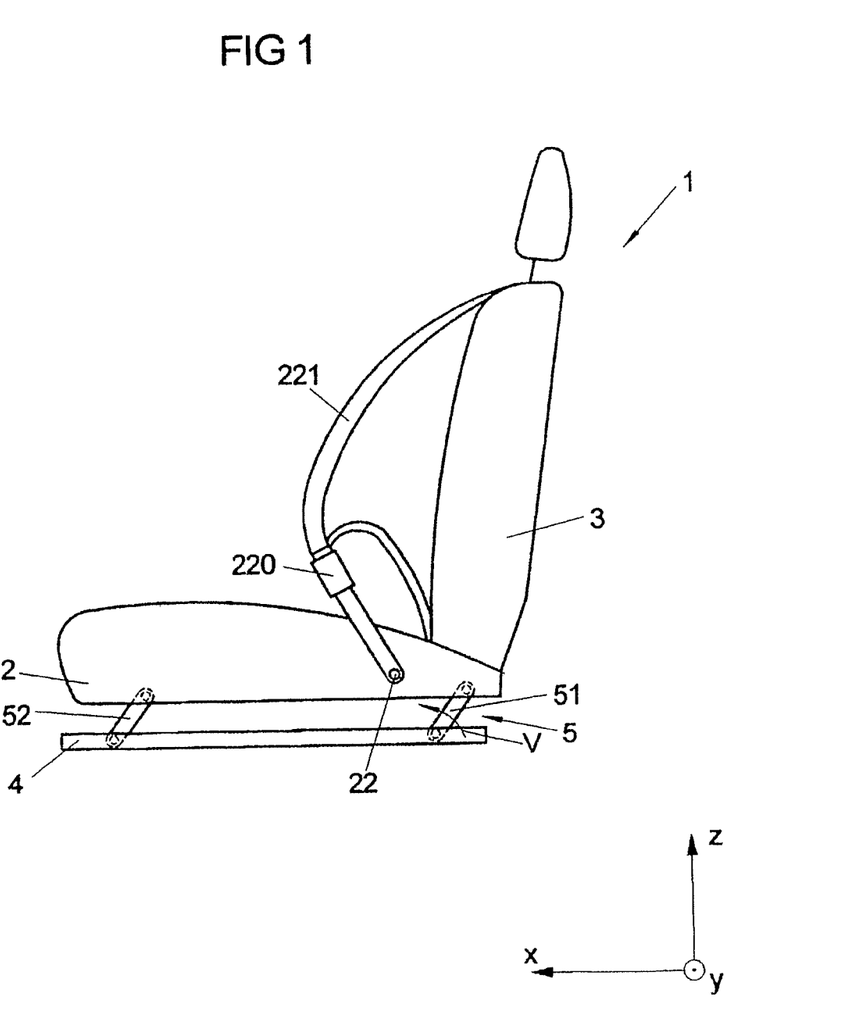
FIG. 1 shows a schematic view of a vehicle seat.

FIG. 1 shows in a schematic view a vehicle seat 1 with a seat part 2 and a backrest 3 connected to the seat part 2, wherein the inclination of said backrest can be adjusted. The seat part 2 is arranged on a vehicle floor of a vehicle (not shown) longitudinally adjustable via a guide track arrangement 4 and connected to the guide track arrangement 4 via rocker pairs 51, 52 height adjustable.

The rocker pairs 51, 52 formed by two parallel rockers, respectively, are connected on the one hand pivotably to the seat part 2 and on the other hand to the guide track arrangement 4 and form in this manner together with the seat part 2 and the guide track arrangement 4 a four joint in order to allow an adjustment of the seat height of the seat part 2 relative to the guide track arrangement 4. The rocker pairs 51, 52 can be pivoted for this purpose along a pivot direction V parallel to each other in order to raise or lower the seat part 2 relative to the guide track arrangement 4 by pivoting the rocker pairs 51, 52.

Figure 2:
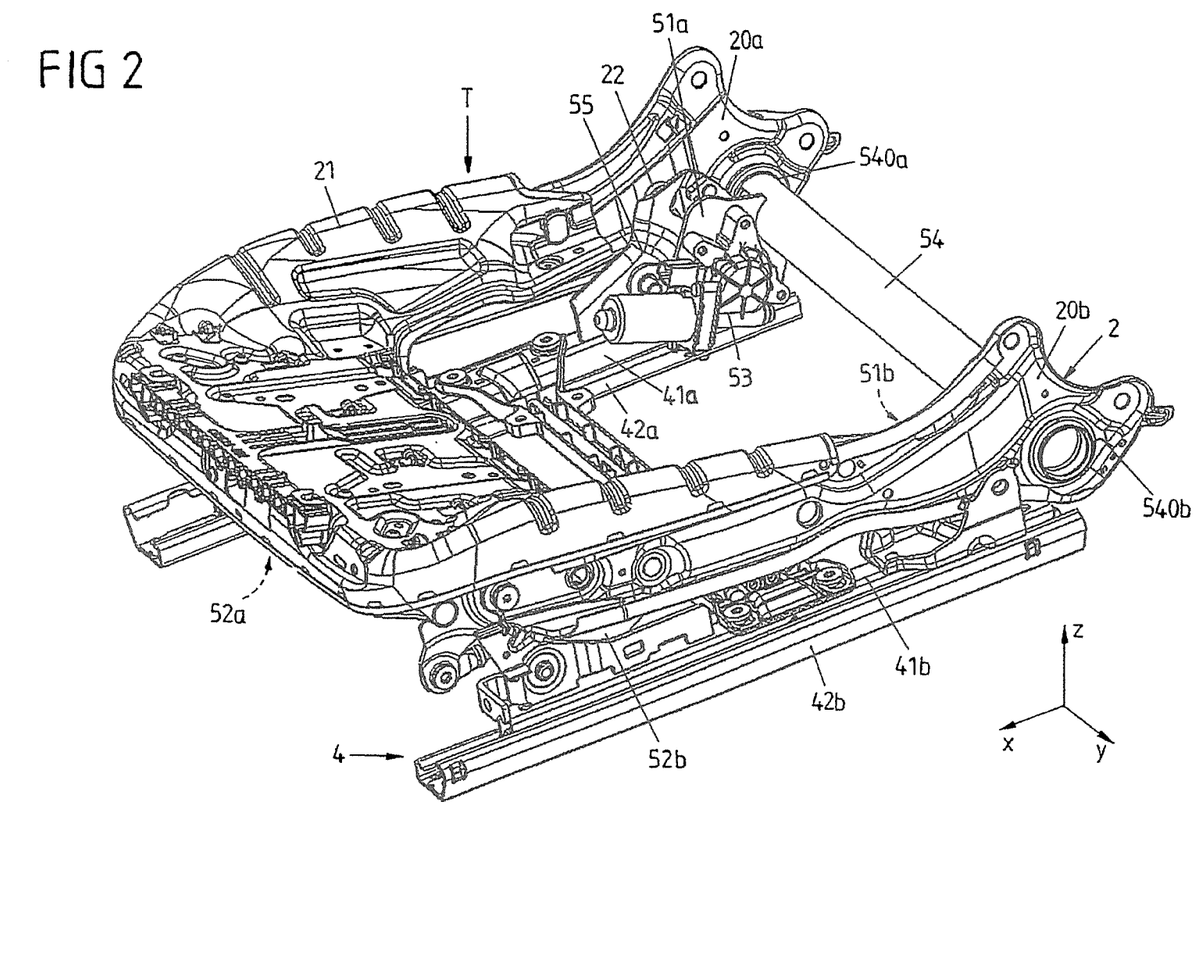
FIG. 2 shows a perspective view of a height adjustable seat part of the vehicle seat connected to a guide track arrangement.

In a concrete embodiment of a seat part 2 and a guide track arrangement 4 according to FIG. 2 the seat part 2 comprises two side parts 20a, 20b forming a seat frame, wherein a cross tube 54 extends there between and a seat pan 21 is arranged pivotably thereon. The cross tube 54 is mounted pivotably to the side parts 20a, 20b via ends 540a, 540b and carries two rockers 51a, 51b, which form a rear rocker pair 51. A front rocker pair 52 is formed by rockers 52a (not visible in FIG. 2), 52b, which form together with the rear rockers 51a, 51b two parallel four joints for height adjustable connection of the side parts 20a, 20b to the guide track arrangement 4.

The guide track arrangement 4 is formed by two parallel guide track pairs 41a, 42a or 41b, 42b extending along a vehicle longitudinal direction X (relative to vehicle seat 1 assembled into a vehicle as intended). The respective upper guide tracks 41a, 41b of said guide track pairs 41a, 41b, 42a, 42b carry hereby the rockers 51a, 51b, 52a, 52b, while the lower guide tracks 42a, 42b are connected to a (not shown) vehicle floor.

The rockers 51a, 51b, 52a, 52b are part of a height adjustment device 5 together with an electromotive drive unit 53, which allows for raising or lowering the seat part 2 relative to the guide track arrangement 4 by pivoting the rockers 51a, 51b, 52a, 52b. When operating the height adjustment device the rocker 51a arranged on the (first) end 540a of the cross tube 54 is driven and moved by means of the drive unit 53, whereby the adjustment movement is transferred synchronically to the rocker 51b connected to the (second) end 540b of the cross tube 54 via the cross tube 54. In this manner the rockers 51a, 51b are pivoted, the seat part 2 is adjusted thereby and the front rockers 52a, 52b are moved passively.

As illustrated in FIGS. 3 to 7 in detail the drive unit 3 realizes a tooth segment-pinion-drive in which an output pinion 531 of the drive unit 53 arranged on an output shaft 530 engages in a tooth segment 552 arranged on the guide track 41a. The drive unit 53 is connected tightly via attachment points 533 to the rocker 51a and attachment points 512 arranged thereon, while the tooth segment 552 is connected to a holding element 55, for instance riveted, and is hold tightly via the holding element 55 on the guide track 41a.

Figure 3:
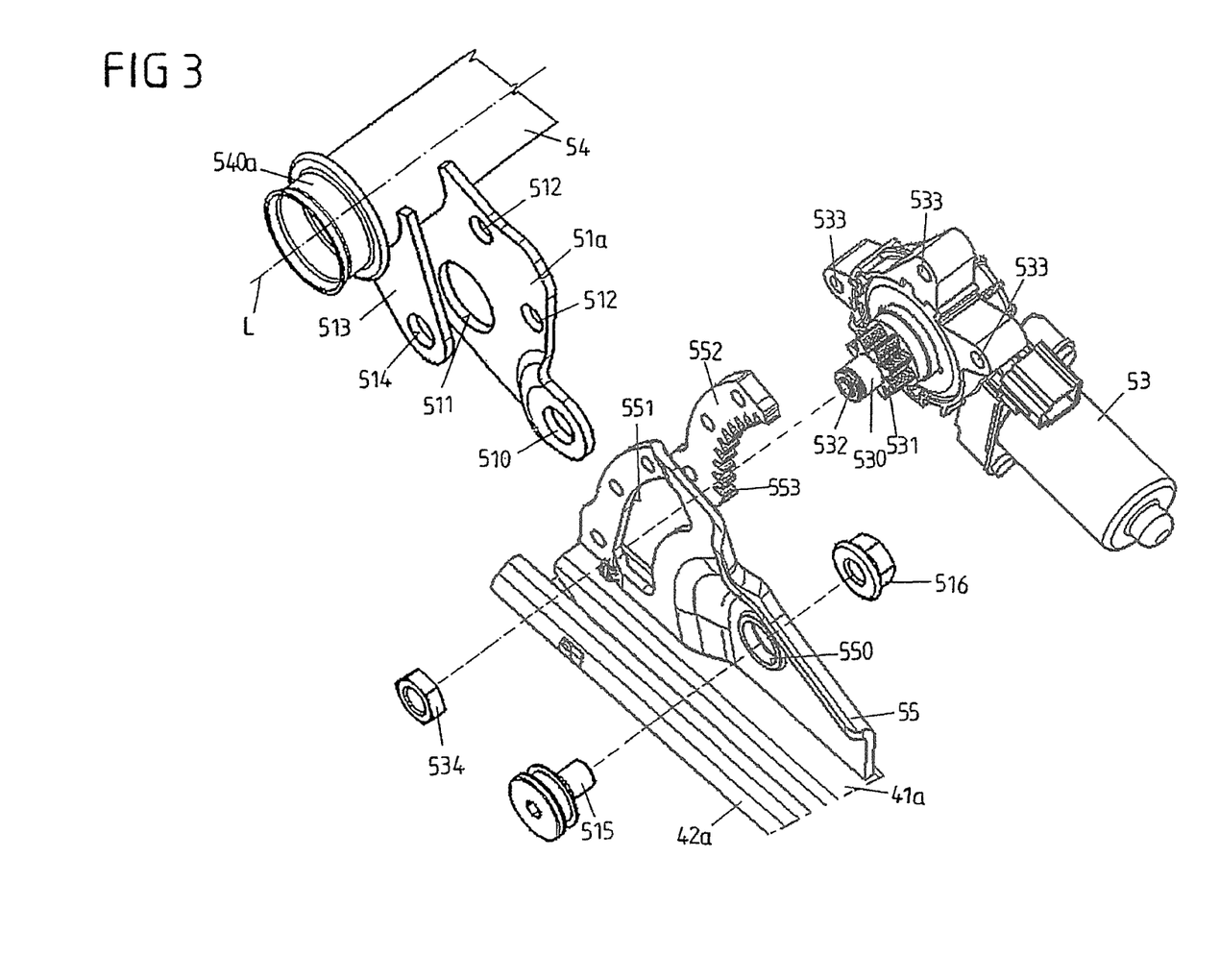
FIG. 3 shows an explosive view of a rocker connected to a cross tube, which is mounted pivotably on the guide track arrangement and is driven by a drive unit.

The holding element 55 serves on the one hand for carrying the tooth segment 552 and on the other hand for mounting the rocker 51a on the guide track 41a. The rocker 51a is hereby hold pivotably via an attachment point 510 on an attachment point 550 of the holding element 55 by means of a fastening bolt 515 and a fastening nut 516.

Figure 4A:
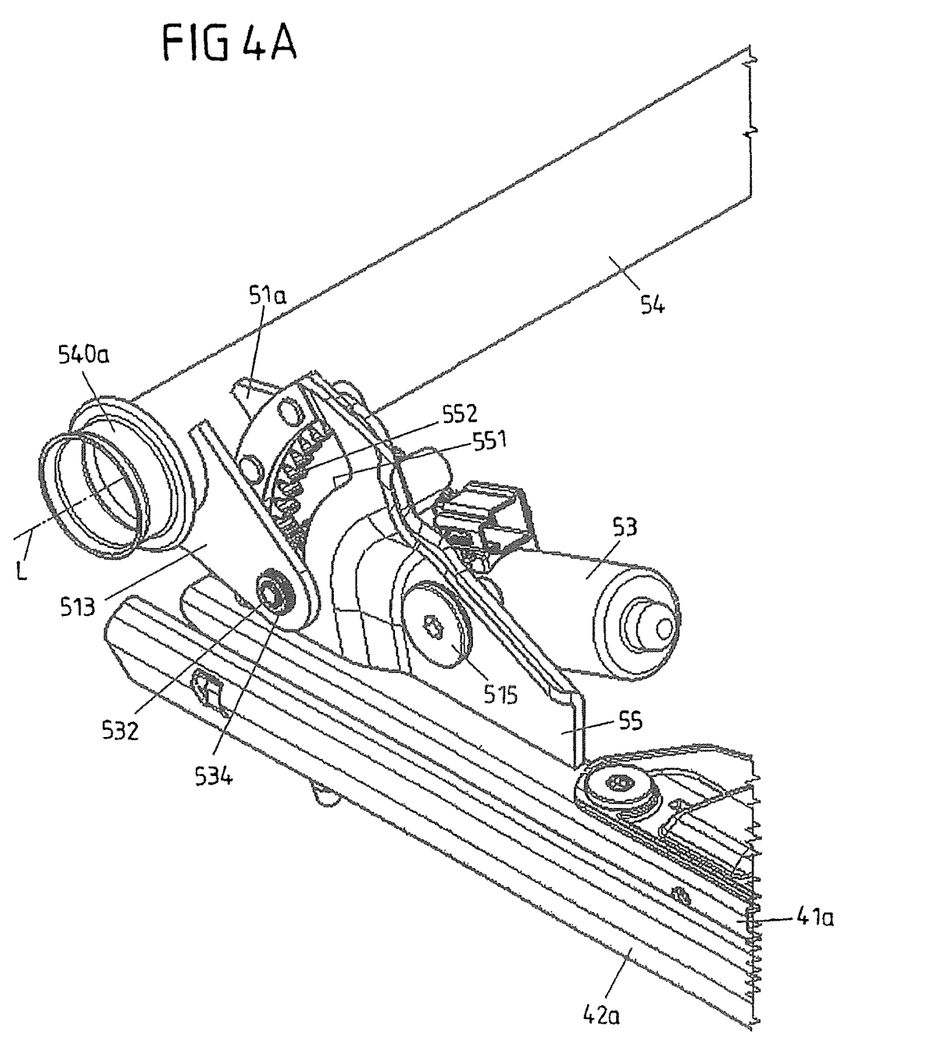
FIG. 4A shows a perspective view of the arrangement according to FIG. 3 in an assembled status with a lowered seat part.
Figure 4B:
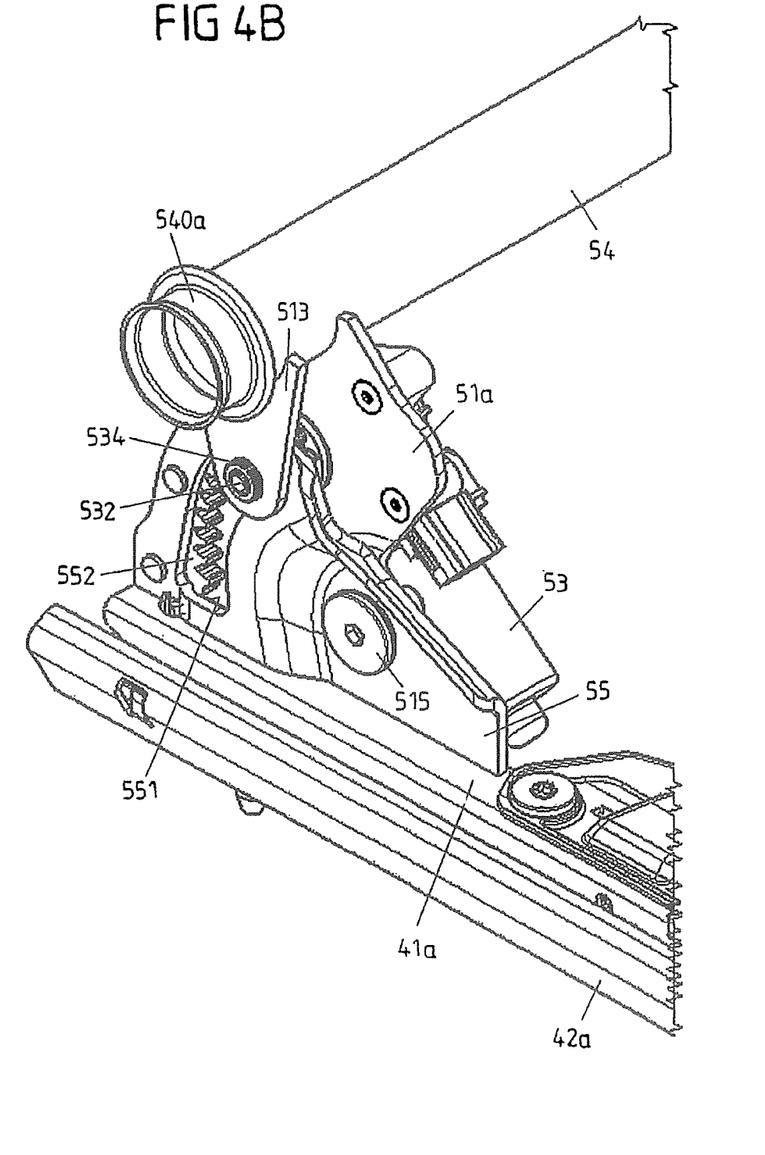
FIG. 4B shows a view of the arrangement as in FIG. 4A, however, with raised seat part.

In the assembled status, for instance illustrated in FIG. 4A, the output pinion 531 reaches through a notch 511 (see FIG. 3) of the rocker 51a and engages in a toothing 553 of the tooth segment 552 on the holding element 55. An end 532 of the output shaft 530 projecting from the output pinion 531 reaches hereby through a notch 514 of a supporting element 513, which extends parallel to the rocker 51a and is connected to the cross tube 54 and supports the output shaft 530 and thus the output pinion 531 in addition relative to the cross tube 54.

A nut 534 is screwed onto the end 532 (which carries a thread therefore) of the output shaft 530 for axial securing.

The rocker 51a and the supporting element 513 are connected tightly, in particular welded, to the cross tube 54, respectively. The cross tube 54 extends hereby along a pivot axis L about which the cross tube 54 is connected pivotably to the side parts 20a, 20b (see FIG. 2), whereby the supporting element 513 and the rocker 51a are offset to each other if looked along the pivot axis L and accommodate there between the tooth segment 552 in the assembled status of the height adjustment device 5 (see FIG. 4A). The output pinion 531 reaches through the notch 511 of the rocker 51a and engages in the toothing 553 of the tooth segment 552. The output shaft 530 extends with the end 532 thereof further through a crank-shaped notch 551 on the holding element 55 towards the supporting element 513 and is supported by the supporting element 513 such that the engagement of the output pinion 531 in the tooth segment 552 is secured against a loosening also in case of large, in particular crash-caused loading forces.

Figure 5A:
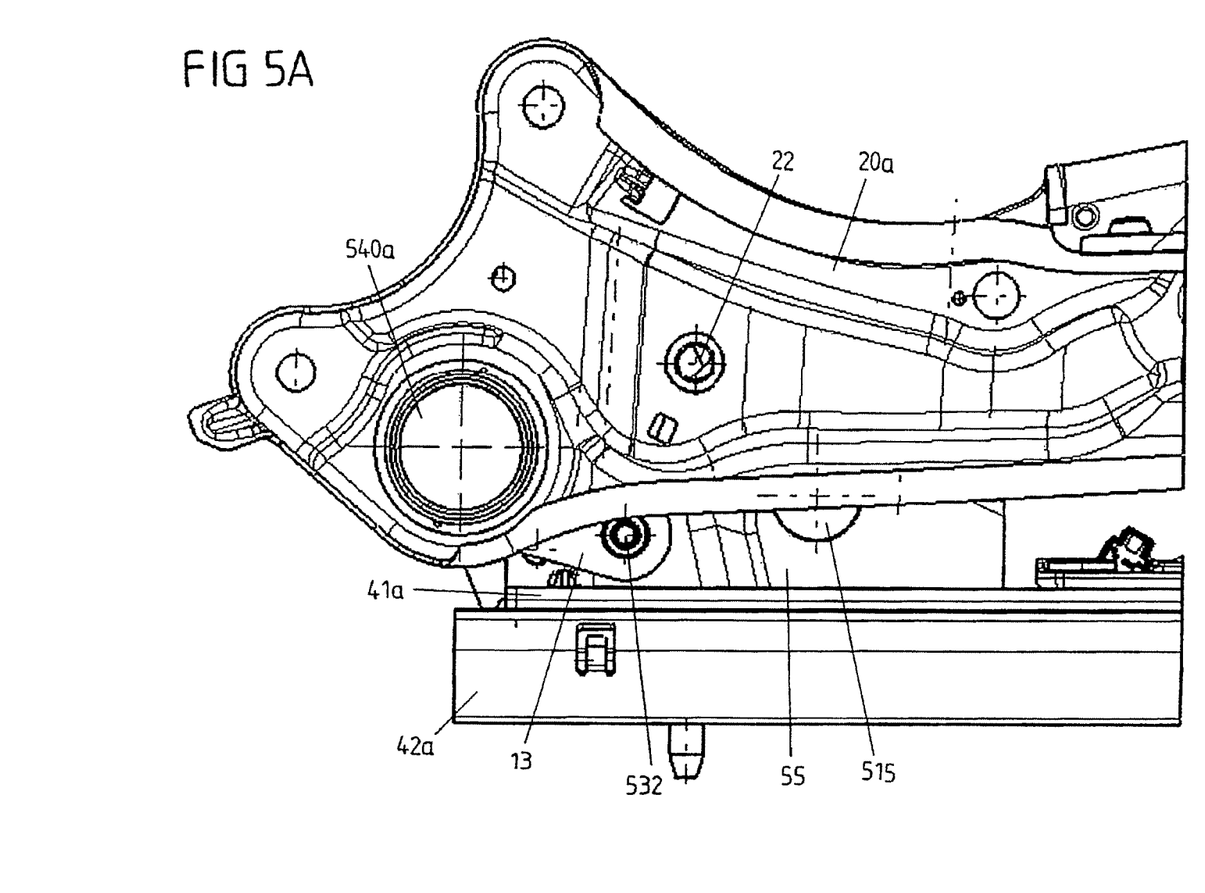
FIG. 5A shows a side view of the arrangement with lowered seat part.
Figure 5B:
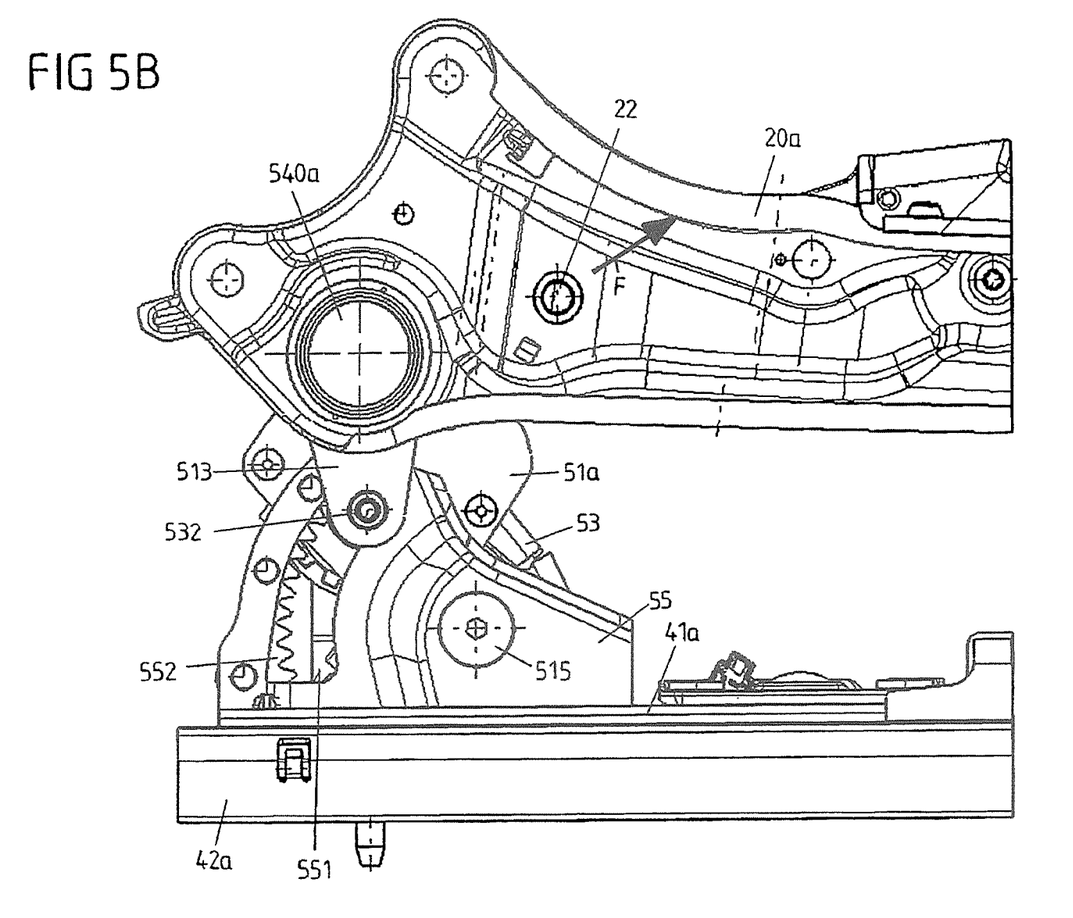
FIG. 5B shows a side view of the arrangement as in FIG. 5A, however, with raised seat part.
Figure 6A:
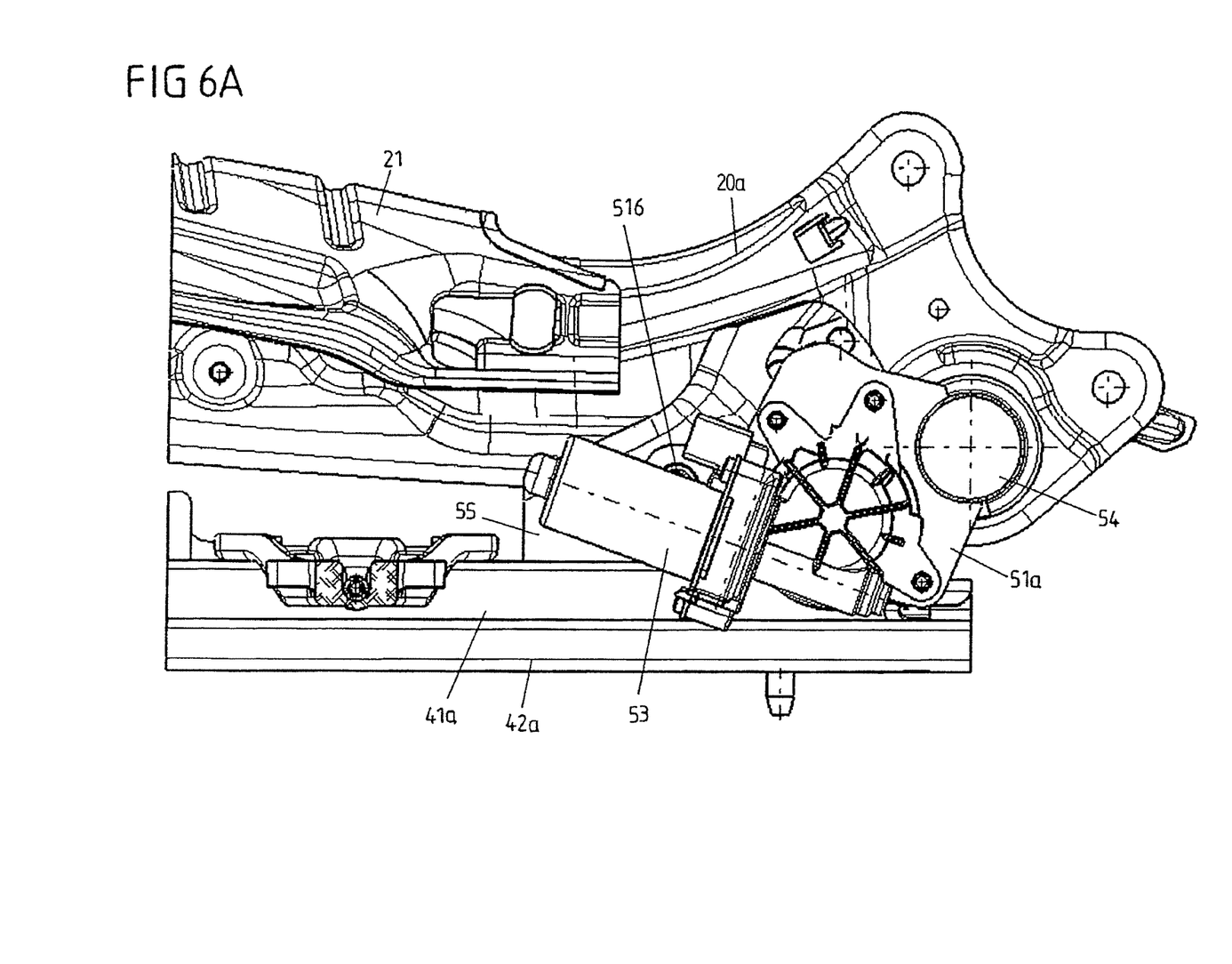
FIG. 6A shows an inside view of the arrangement with lowered seat part.
Figure 6B:
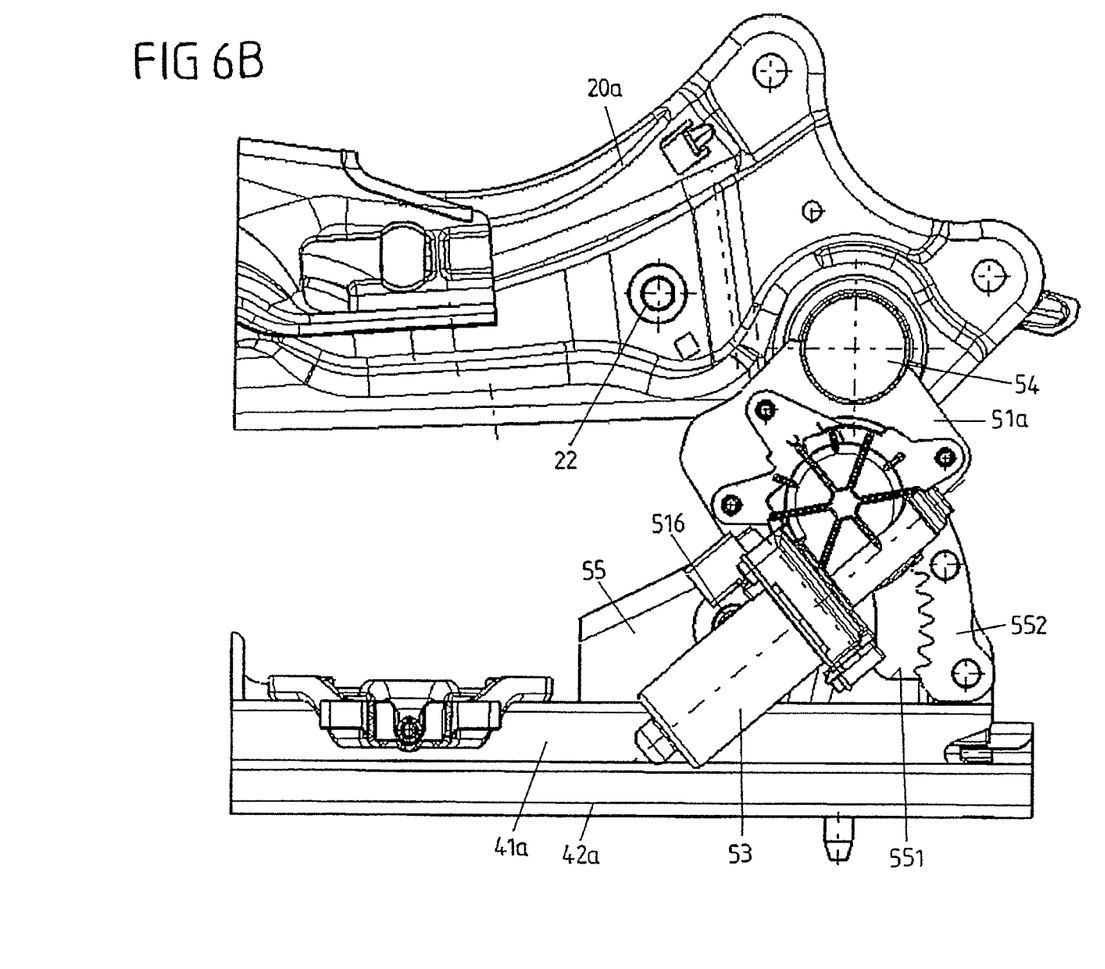
FIG. 6B shows an inside view of the arrangement as in FIG. 6A, however, with raised seat part.
Figure 7:
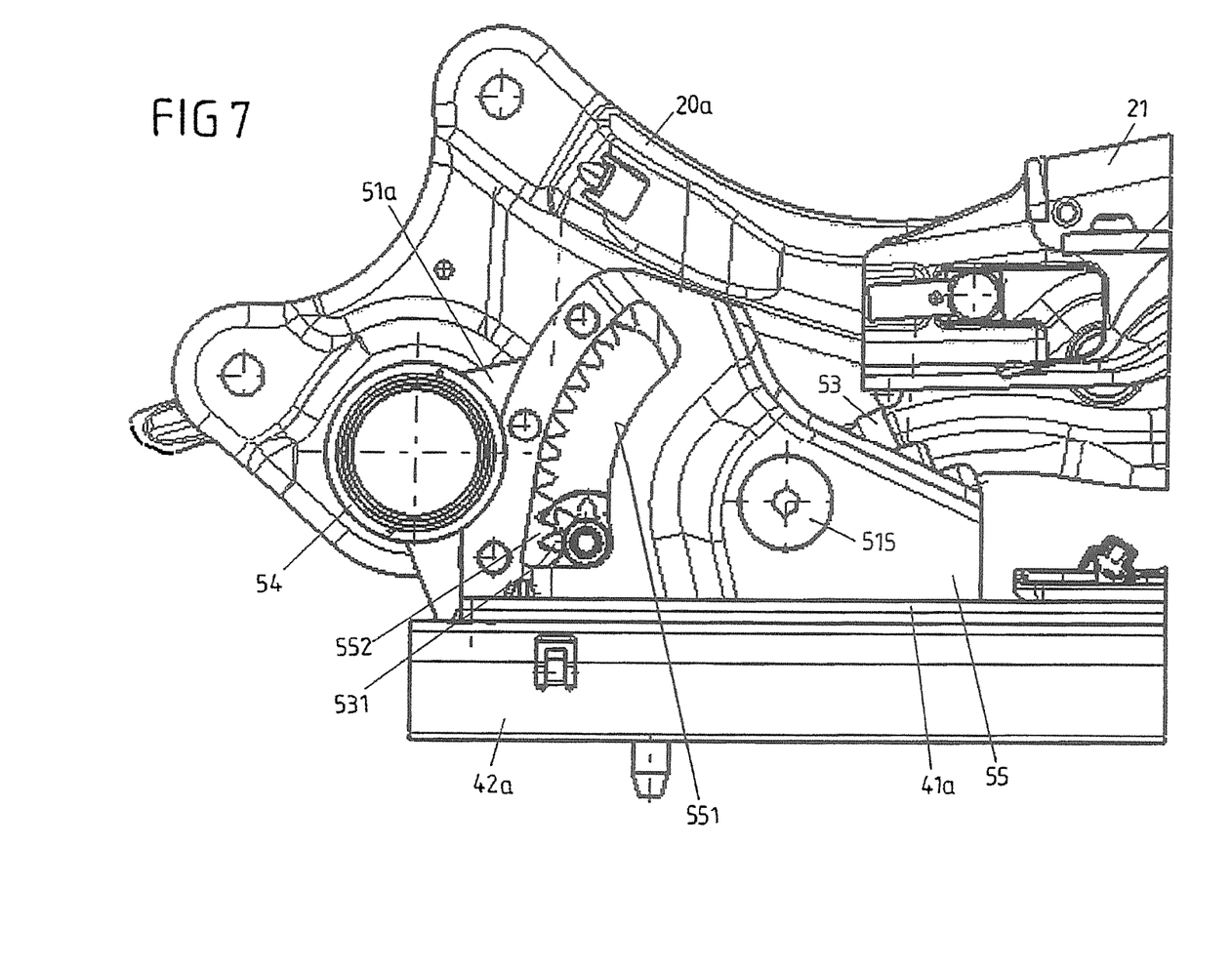
FIG. 7 shows a partially open cut view of the arrangement with lowered seat part.

FIGS. 4A, 4B, 5A, 5B, 6A, 6B show the rocker 51a in different views and operation conditions. FIGS. 4A, 5A and 6A show hereby the rocker 51a in a lowered seat part 2, FIGS. 4B, 5B and 6B in contrast in a raised seat part 2. The output pinion 531 is driven by the drive unit 53 for adjusting and therefore rotated relative to the tooth segment 552 such that the output pinion 531 rolls along the tooth segment 552 and adjusts the rocker 51a relative to the stationary tooth segment 552 mounted on the guide track 41a. The drive unit 53, which is connected tightly to the rocker 51a, is pivoted also together with the rocker 51a.

Since the drive unit 53 is arranged stationary on the rocker 51a and is moved together with the rocker 51a a compact construction with reduced space requirement and high crash security is achieved. When arranging the drive unit 53 on the rocker 51a in particular no construction space has to be provided on one of the side parts 20a, 20b or one of the guide tracks 41a, 41b for attaching the drive unit 53.

The height adjustment device 5 with the drive unit 53 realizing a tooth segment-pinion-drive adds to a high stability of the connection of the seat part 2 to the guide track arrangement 4. The arrangement is hereby designed in particular for supporting the loading forces introduced into the seat part 2 in a crash case via a belt attachment point 22 (see FIG. 1 and FIG. 2) and dissipate said forces via a comparatively short force path into the guide track arrangement 4 and furthermore into a vehicle floor.

A belt lock 220 can be mounted for connecting a safety belt 221 on the seat part 2 via the belt attachment point 22 (see FIG. 1). The advantage of such an arrangement is that the belt lock 220 is moved together with the seat part 2 and the position of the belt lock 220 relative to the seat part 2 is independent from the just adjusted height or longitudinal position of the seat part 2 for an occupant sitting on the seat part 2. The disadvantage is, however, that in case of a crash large forces can act on the seat part 2 via the belt attachment point 2 and are introduced into the seat part 2, which have to be securely supported in order to avoid in case of a crash an improper shift of the belt attachment point 22 (in particular a pre-shifting in case of a front crash).

As deducible from FIG. 2 and FIGS. 5A, 5B and 6B the belt attachment point 22 is arranged in the illustrated embodiment in close proximity to the rocker 51a carrying the drive unit 53. The belt attachment point 22, which is located on a tunnel side T (see FIG. 2) of the seat part 2 situated towards the vehicle centre (in respect to the vehicle seat 1 assembled into a vehicle as intended) and accordingly on the tunnel side part 20a, is thereby directly adjacent to the connecting point of the cross tube 54 to the side part 20a.

Since the rocker 51a is locked and supported via the drive unit 53 and the engagement of the output pinion 531 in the tooth segment 552 in respect to the guide track 41a, a short force path results for the loading forces introduced via the belt point 22, acting preferably in a loading direction F (see FIG. 5B). These loading forces are dissipated via the side part 20a, the cross tube 54, the rocker 51a, the output pinion 531 and the holding element 55 in a short path into the guide track 41a and furthermore into the vehicle floor and thus is supported in a rigid tight manner such that an inadmissible large belt point shift is avoided also in case of large loading forces. This short force path is possible since the drive unit 53 with the output pinion 531 is arranged stationary on the rocker 51a and allows thus a direct force input via the tooth segment 552 arranged stationary on the guide rail 41a into the guide track 41a.

The idea underlying the invention is not restricted to the previously described embodiments but can be also realized in embodiments having a different nature.

An arrangement of the drive unit on a side of the vehicle seat located towards the vehicle door is in particular also conceivable and possible, for instance if no (tunnel side) belt attachment point is provided on the seat part 2. An arrangement of a drive unit on a front rocker is also conceivable.

It is also possible that the drive unit is not mounted on the driven rocker, but solely the output pinion is arranged stationary on the rocker and is driven for instance by a flexible shaft.

The invention claimed is:
1. A vehicle seat comprising
a seat part for providing a seat surface for a seat occupant,
a guide track arrangement for the longitudinally adjustable arrangement of the vehicle seat in a vehicle and
a height adjustment device comprising a plurality of rockers which are pivotably coupled to the seat part and the guide track arrangement, which connect the seat part to the guide track arrangement so as to be adjustable in height, and a electromotive drive unit for driving a first rocker of the plurality of rockers, wherein the drive unit has an output pinion, which engages in a toothing of a tooth segment and can be set into a rotation in respect to the tooth segment for adjusting the seat height of the seat part relative to the guide track arrangement, wherein the output pinion is arranged on the first rocker and the tooth segment is arranged stationary on the guide track arrangement or on the seat part, wherein the electromotive drive unit is fixedly connected to the first rocker.

2. The vehicle seat according to claim 1, wherein the seat part comprises two side parts between which a cross tube extends along a pivot axis, wherein the cross tube is mounted pivotably about the pivot axis (L) and is fixedly connected to the first rocker.

3. The vehicle seat according to claim 2, wherein a belt attachment point for attaching a safety belt is arranged on a first of the side parts and the first rocker is arranged on an end of the cross tube facing the first side part.

4. The vehicle seat according to claim 3, wherein the first rocker is part of a rear rocker pair which, in respect to a vehicle longitudinal direction, is arranged behind a front rocker pair.

5. The vehicle seat according to claim 3, wherein the first rocker, if looked at along a vehicle cross direction, is arranged at a tunnel side of the vehicle seat located towards a vehicle centre.

6. The vehicle seat according to claim 2, wherein the output pinion reaches through a notch of the first rocker and engages in the toothing of the tooth segment, wherein the output pinion is arranged at an output shaft which projects with an end from the output pinion and is supported by a supporting element in respect to the cross tube.

7. The vehicle seat according to claim 6, wherein the first rocker and the supporting element in each case are fixedly connected to the cross tube, project from the cross tube across to the pivot axis, and receive the tooth segment there between, if looked along the pivot axis.

8. The vehicle seat according to claim 2, wherein the output pinion reaches through a notch of the first rocker and engages in the toothing of the tooth segment, wherein the output pinion is arranged on an output shaft, which projects with one end from the output pinion, wherein a lock washer for axial securing the engagement of the output pinion in the tooth segment is arranged on the end.

9. The vehicle seat according to claim 1, wherein the tooth segment is fixedly connected to the guide track arrangement via a holding element.

10. The vehicle seat according to claim 9, wherein the first rocker is mounted pivotably on the guide track arrangement via the holding element.

* * * * *